US006757425B2

(12) United States Patent
Pettigrew et al.

(10) Patent No.: US 6,757,425 B2
(45) Date of Patent: Jun. 29, 2004

(54) PROCESSING IMAGE DATA TO TRANSFORM COLOR VOLUMES

(75) Inventors: Daniel Pettigrew, Montreal (CA); Francois Paquin, Montreal (CA)

(73) Assignee: Autodesk Canada Inc., Quebec (CA)

( * ) Notice: Subject to any disclaimer, the term of this patent is extended or adjusted under 35 U.S.C. 154(b) by 559 days.

(21) Appl. No.: 09/780,550

(22) Filed: Feb. 9, 2001

(65) Prior Publication Data

US 2001/0028738 A1 Oct. 11, 2001

(30) Foreign Application Priority Data

Apr. 7, 2000 (GB) .............................................. 0008561

(51) Int. Cl.$^7$ ................................................. G06K 9/00
(52) U.S. Cl. ...................................... 382/162; 345/600
(58) Field of Search ................................ 382/162–167; 358/518–523; 345/589–604

(56) References Cited

U.S. PATENT DOCUMENTS

| 5,412,773 A | * | 5/1995 | Carlucci et al. ............. 345/723 |
| 5,506,946 A | * | 4/1996 | Bar et al. .................... 345/600 |
| 5,625,738 A | * | 4/1997 | Magarill ...................... 385/146 |
| 5,874,988 A | * | 2/1999 | Gu .............................. 382/167 |
| 6,292,195 B1 | * | 9/2001 | Shimizu et al. ............. 345/604 |
| 6,323,969 B1 | * | 11/2001 | Shimizu et al. ............. 358/523 |
| 6,456,300 B1 | * | 9/2002 | Pettigrew .................... 345/634 |
| 6,496,599 B1 | * | 12/2002 | Pettigrew .................... 382/162 |
| 6,571,012 B1 | * | 5/2003 | Pettigrew .................... 382/167 |

FOREIGN PATENT DOCUMENTS

| JP | 090198018 A | 7/1997 |
| JP | 110017968 A | 1/1999 |
| WO | WO 98/10586 | 3/1998 |

* cited by examiner

Primary Examiner—Jingge Wu
(74) Attorney, Agent, or Firm—Gates & Cooper LLP (57) ABSTRACT

A method of modifying image colors in which a user identifies a source color (707) and a destination color (708) having a common luminance (704). Source and destination color volumes (821, 822) are defined by firstly identifying two points (811, 812) opposite in color to the source (707), and secondly by selecting the most distant of white or black (813) as another point. The source color volume (821) and destination color volume (822) have these three points in common. A transformation is then defined (804) to transform from the source to the destination volume. This transformation, when applied (805) to image colors, results in the color change intended by the user.

30 Claims, 11 Drawing Sheets

MATRIX 'A' TRANSFORMS RGB TO Y/Pb Pr

MATRIX 'A$^{-1}$' TRANSFORMS Y/Pb Pr TO RGB

RGB BLACK = ( 0, 0, 0 );  Y/Pb Pr BLACK = ( 0, 0, 0 )
RGB WHITE = ( 1, 1, 1 );  Y/Pb Pr WHITE = ( 1, 0, 0 )

$$\begin{bmatrix} S1X & 0 & 0 & 0 & S1Y & 0 & 0 & 0 & S1Z & 0 & 0 & 0 \\ 0 & S1X & 0 & 0 & 0 & S1Y & 0 & 0 & 0 & S1Z & 0 & 0 \\ 0 & 0 & S1X & 0 & 0 & 0 & S1Y & 0 & 0 & 0 & S1Z & 0 \\ S2X & 0 & 0 & 0 & S2Y & 0 & 0 & 0 & S2Z & 0 & 0 & 0 \\ 0 & S2X & 0 & 0 & 0 & S2Y & 0 & 0 & 0 & S2Z & 0 & 0 \\ 0 & 0 & S2X & 0 & 0 & 0 & S2Y & 0 & 0 & 0 & S2Z & 0 \\ S3X & 0 & 0 & 0 & S3Y & 0 & 0 & 0 & S3Z & 0 & 0 & 0 \\ 0 & S3X & 0 & 0 & 0 & S3Y & 0 & 0 & 0 & S3Z & 0 & 0 \\ 0 & 0 & S3X & 0 & 0 & 0 & S3Y & 0 & 0 & 0 & S3Z & 0 \\ S4X & 0 & 0 & 0 & S4Y & 0 & 0 & 0 & S4Z & 0 & 0 & 0 \\ 0 & S4X & 0 & 0 & 0 & S4Y & 0 & 0 & 0 & S4Z & 0 & 0 \\ 0 & 0 & S4X & 0 & 0 & 0 & S4Y & 0 & 0 & 0 & S4Z & 0 \end{bmatrix}$$

$$D = \begin{bmatrix} D1X & D1Y & D1Z & D2X & D2Y & D2Z & D3X & D3Y & D3Z & DAX & D4Y & D4Z \end{bmatrix}$$

*Fig.11*

PROCESSING IMAGE DATA TO TRANSFORM COLOR VOLUMES

BACKGROUND OF THE INVENTION

1. Field of the Invention

The present invention relates to image processing apparatus, a method of processing image data and a data carrying medium.

2. Description of the Related Art

The digitisation of image processing has enabled many new image manipulation techniques to be developed. Available digital processing effects include a process of color warping, in which color attributes of an image, or area of an image, can be modified in some way. Common uses for such a technique are removal of unwanted color artefacts, special effects and control over aesthetics.

Many image processing systems provide control over color through the use of gamma correction curves. Gamma correction curves define transfer functions that are applied to red, green and blue image data values, in such a way that a color transformation occurs. However, manipulation of such curves to produce satisfactory results is extremely difficult. In the case of creating special effects, the lack of intuitive feel of such an approach makes such an approach extremely limited.

From a mathematical perspective, many systems provide color transformations defined in terms of matrices. Matrices may be used to define arbitrary transformations in color space, just as they are used in the more familiar world of computer modelling and computer-aided design. However, although such techniques theoretically provide an enhanced level of control over color space, and have the potential to provide useful color warping tools, the lack of an intuitive relation between the mathematics and the effect upon the colors of an image makes these techniques difficult to apply.

In particular, a common requirement in image processing is to change one particular color in an image, for example, to modify the blue color of the sky, or the green color of an apple. These are requirements that are easily stated in artistic terms. However, known image processing tools are restricted in their ability to provide an appropriate interpretation of the artist's intention in these cases.

BRIEF SUMMARY OF THE INVENTION

According to an aspect of the present invention, there is provided apparatus for processing image data, comprising storage means arranged to store instructions, memory means for storing said instructions during execution and for storing image data, processing means for performing image processing in which said image data is processed to modify color values, and display means for facilitating user interaction with said image processing, wherein said processing means is configured such that, in response to said instructions, said image data is processed by steps of: identifying a source color; identifying a destination color; identifying three fixed points in color space; identifying a source color volume defined by said source color with said three fixed points; identifying a destination color volume defined by said destination color and said three fixed points; and defining a correspondence transformation between said source and said destination color volumes and applying said correspondence transformation to said image data.

BEST MODE FOR CARRYING OUT THE INVENTION

Figure 1:
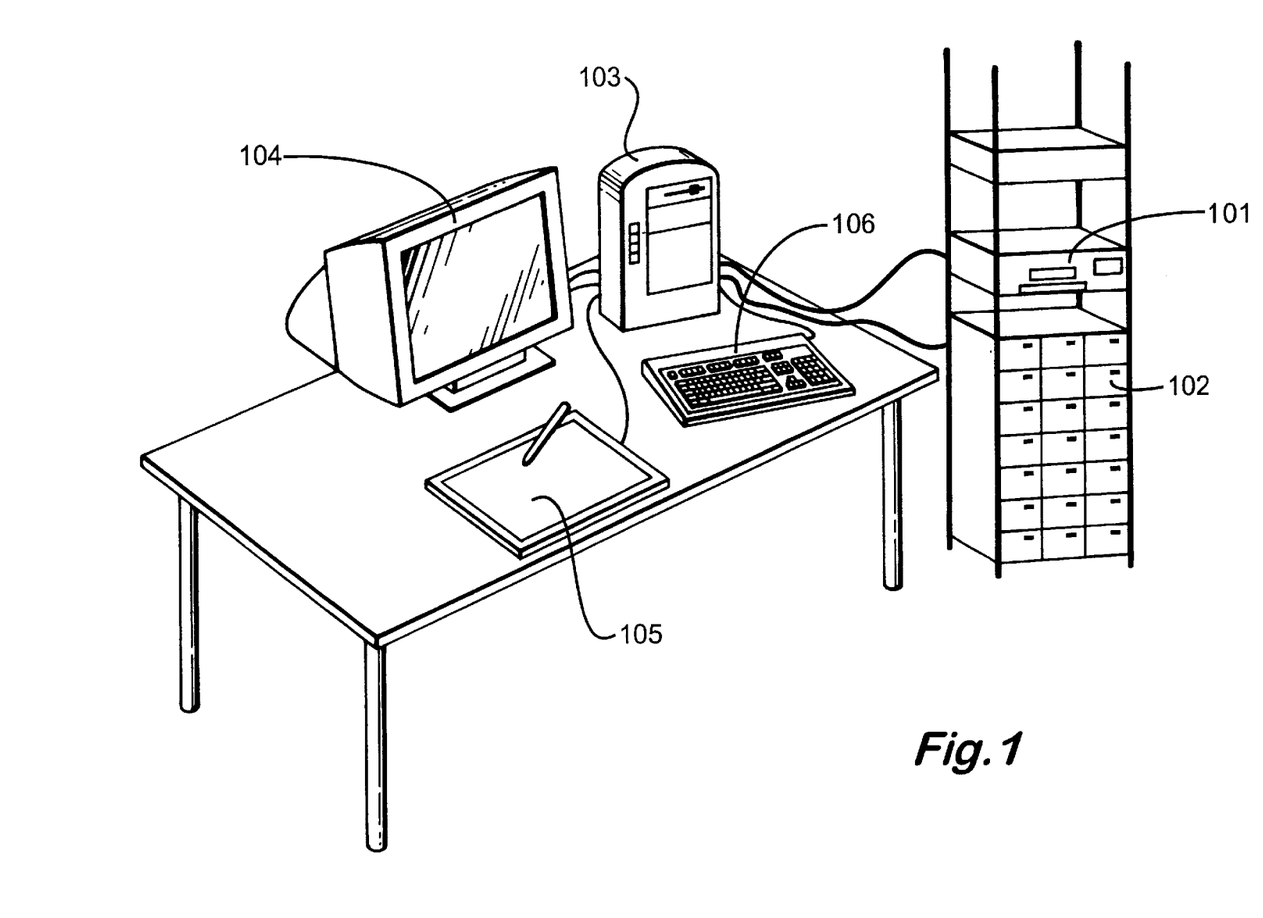
FIG. 1 shows an image processing system including a computer and a monitor.

A system for the processing of image data is illustrated in FIG. 1. A digital tape player 101 plays and records digital tapes having a high data capacity suitable for storing many frames of high definition image data. In preparation for image processing, images for a film clip are transferred from a tape in the tape player 101 to a frame store 102. The frame store 102 comprises several high capacity hard disk drives, arranged to supply and store image data in parallel across many individual drives at once. The hard disk drives are configured as a redundant array of inexpensive disks (RAID). Using the frame store 102, it is possible to play back and record high resolution film images at any location in a clip without having to wait for a tape wind mechanism to reach the required frame. Furthermore the frame store facilitates real time play and record of image data, when the amount of processing being performed is minimal, for example when previewing a stored clip.

A computer 103 facilitates the transfer of image data between the tape player 101 and the frame store 102. The computer 103 also facilitates the modification, processing and adjustment of image data to form an output clip that will eventually be stored onto digital tape. The computer is a Silicon Graphics Octane (TM). Images are previewed on a monitor 104 on which is also displayed a graphical user interface (GUI) to provide the user with several controls and interfaces for controlling the manipulation of image data. When processing image data, the user interacts with images and the graphical user interface displayed on the monitor 104 via a graphics tablet 105. For alphanumeric input, there is provided a keyboard 106, although facilities may be provided via the graphical user interface to facilitate occasional text input using the graphics tablet 105.

In addition to receiving image data from the tape player 101 and the frame store 102, the computer 103 may receive image and or other data over a network. The image processing system shown in FIG. 1 facilitates the manipulation of image data by a digital artist in order to achieve high quality special effects and processing of image data.

In a typical application, film clips are digitised and stored on digital tape for transfer to the system shown in FIG. 1.

The film clips include several camera shots that are to be combined into the same scene. It is the task of the user or digital artist to combine and process this source image data into a single output clip that will be stored back onto tape for later transfer to film or video. Typical examples of this type of scene are where real images shot by a film camera are to be combined with artificially generated images and backgrounds, including scenes where actors are to be placed in computer-generated environments.

Figure 2:
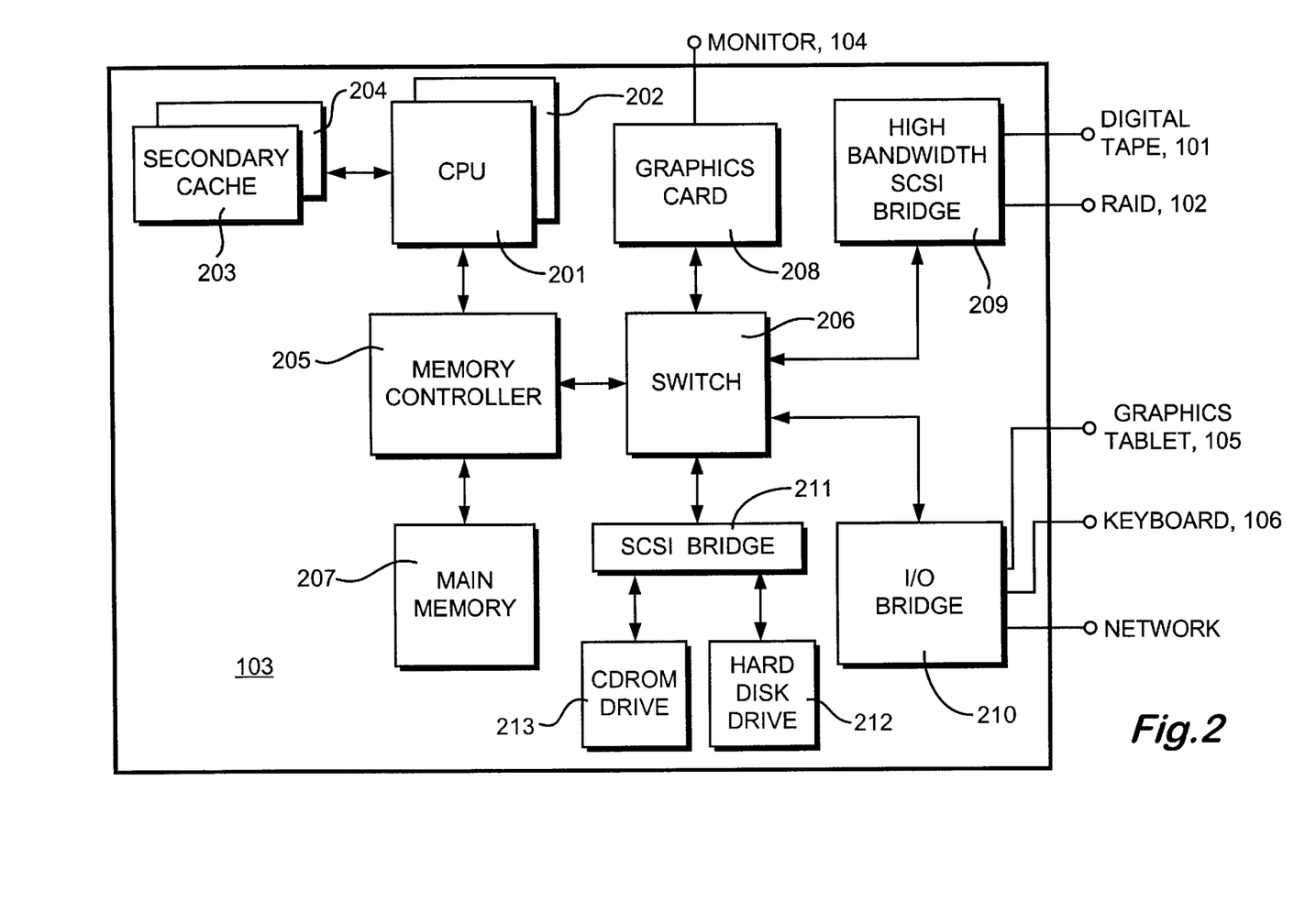
FIG. 2 details components of the computer shown in FIG. 1, including a main memory.

The computer 103 shown in FIG. 1 is detailed in FIG. 2. Two MIPS R12000 central processing units (CPUs) 201 and 202 are configured to process instructions and data in parallel. Primary cache facilities are provided within each of the processors 201 and 202 in the form of a separate instruction and data cache. Both processors 201 and 202 are equipped with a one megabyte secondary cache 203 and 204. The CPUs 201 and 202 are connected via a memory controller to a switch 206 and a main memory 207. The main memory 207 comprises two gigabytes of dynamic RAM.

The switch 206 enables up to seven different non-blocking connections to be made between connected circuits. A graphics card 208 receives instructions from a CPU 201 or 202 in order to render image data and graphical user interface components on the monitor 104. A high bandwidth SCSI bridge 209 facilitates high bandwidth communications to be made with the digital tape player 101 and the frame store 102. An I/O bridge 210 provides input output interface circuitry for peripherals, including the graphics tablet 105, the keyboard 106 and a network. A second SCSI bridge 211 provides interface connections with an internal hard disk drive 212. This has a capacity of thirteen gigabytes. The second SCSI bridge 211 also provides connections to a CDROM drive 213, from which instructions for the central processing units 201 and 202 may be installed onto the hard disk 212.

Figure 3:
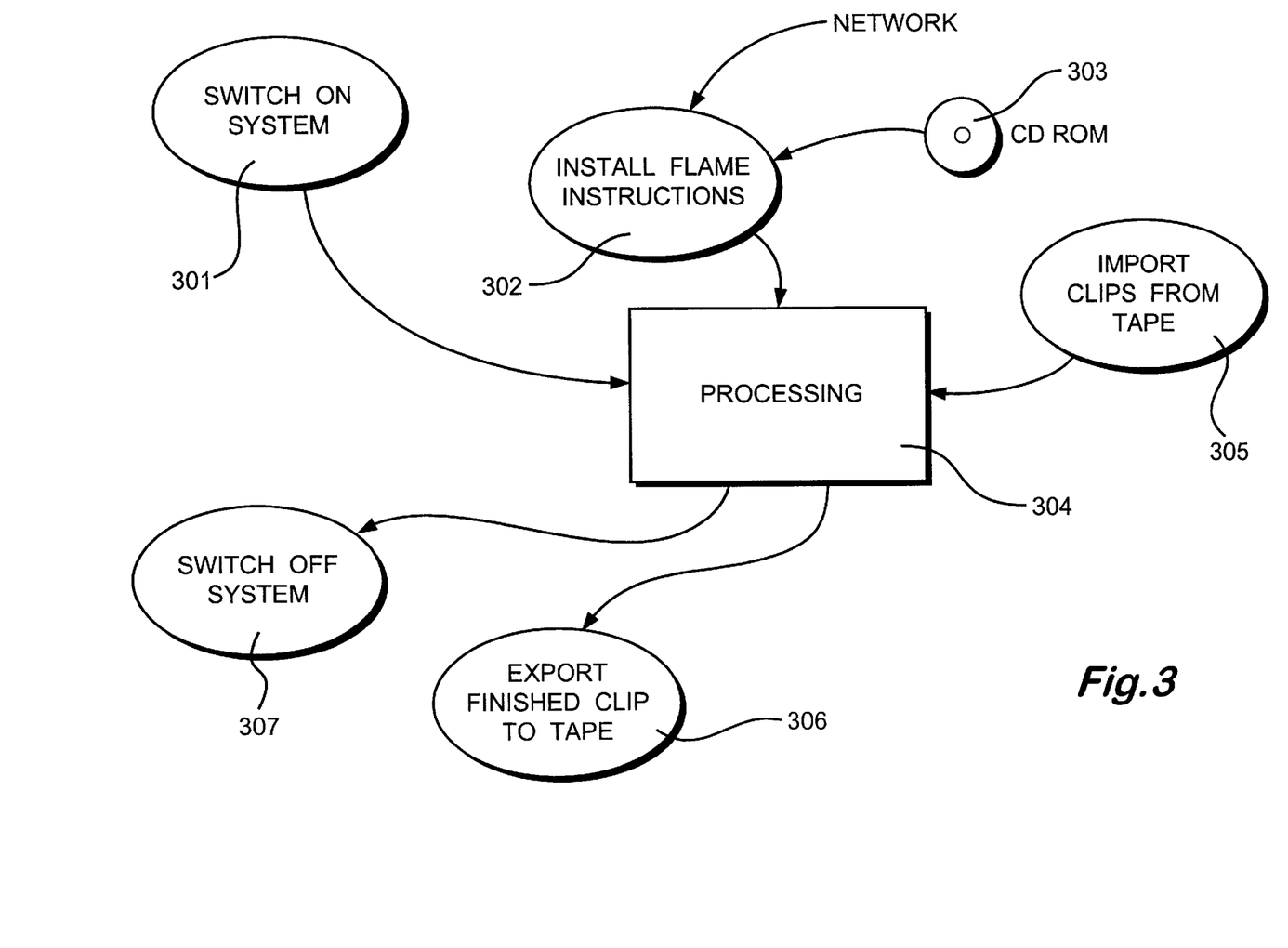
FIG. 3 details user operations performed on the image processing system shown in FIG. 1, including processing images.

Steps performed by the user when operating the image processing system shown in FIG. 1 are detailed in FIG. 3. At step 301 the user switches on the computer 103 and logs on to their user account. If necessary, the user proceeds to step 302 in order to install Flame instructions onto the computer's hard disk 212. Instructions may be provided on a CDROM 303 via the CDROM drive 213, or over a network. Thereafter, control is directed to step 304, whereafter the instructions are executed by the CPUs 201 and 202.

If starting on a new job, it will be necessary to obtain image data from film or video clips stored on digital tapes. This is done at step 305, where input clips are transferred from the tape player 101 to the digital frame store 102. Once a finished clip has been generated from the input clips, this is exported to tape at step 306. Alternative forms of import and export of image data may be performed as necessary, including transfer of image data over a network, transfer of image data from CDROM or transfer of data directly from a camera that may be connected to the input of a suitably equipped graphics card 208. Once finished using the image processing system, at step 307 the user logs off from their account and the computer and other equipment are switched off if necessary.

Figure 4:
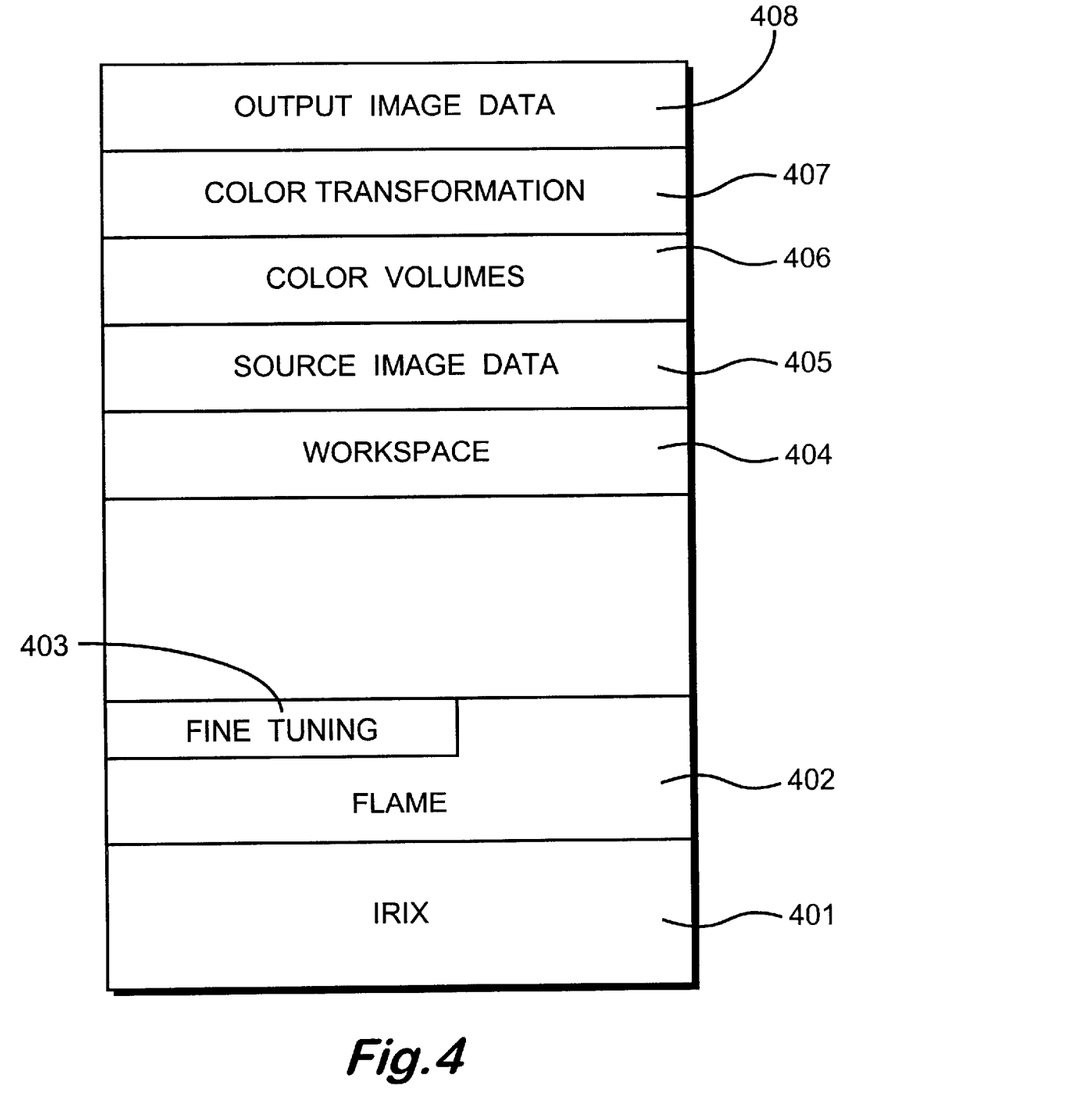
FIG. 4 details the contents of the main memory shown in FIG. 2 as they would appear during the image processing shown in FIG. 3.

The contents of the main memory 207 shown in FIG. 2, during image processing 304, are detailed in FIG. 4. An operating system 401 provides common instructions required for applications running on the computer 103. A suitable operating system is the Irix (TM) operating system available from Silicon Graphics.

In the present embodiment, the main memory includes Flame instructions 402 for image processing. The present applicant has image processing applications that include Flame (TM), and the word Flame will henceforward refer to an improved version of Flame, operating in accordance with the present invention. Flame instructions 402 include fine tuning instructions 403. The instructions 402 and 403 may originate from a CDROM 303 or over a network connection, such as an Internet connection.

Main memory 207 further comprises a workspace 404, used for temporary storage of variables and other data during execution of instructions 401, 402 and 403 by the processors 201 and 202. The main memory also includes areas for source image data 405, definitions of color volumes 406, a color transformation 407 and output image data 408.

Figure 5:
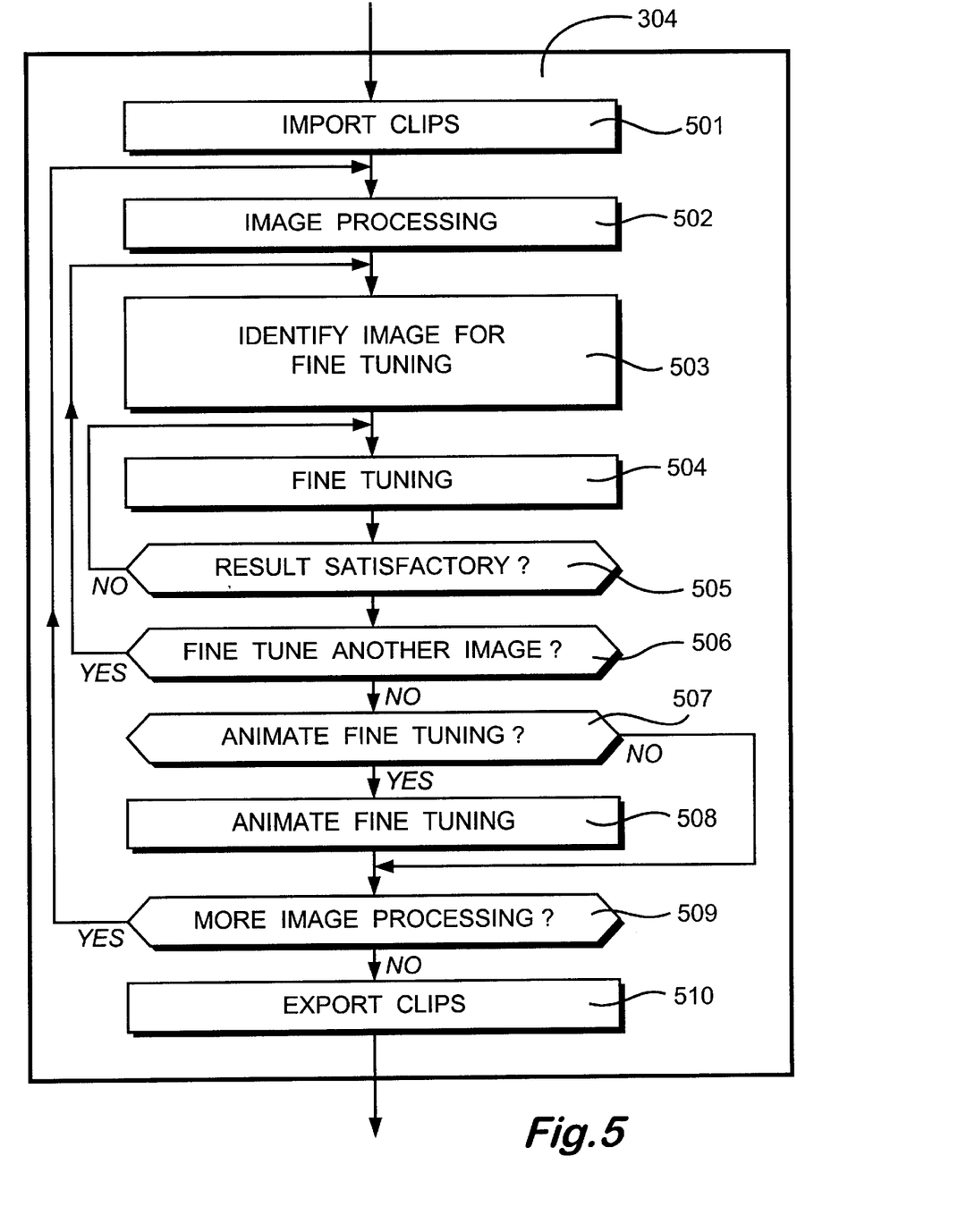
FIG. 5 details processes performed during image processing shown in FIG. 3, including a process of fine tuning.

Image processing 304 shown in FIG. 3, facilitated by instructions 402 and 403, is detailed in FIG. 5. At step 501 the user initiates operations to import clips of image data. A clip comprises sequential image frames that may originate from a variety of sources, such as video or film. Each frame may comprise several megabytes of image data, depending upon the source and data format. The import operation results in a transfer of image data from a source medium, such as a digital tape on digital tape player 101, to the frame store 102.

At step 502, image processing other than color warping is performed. Many operations may be performed at step 502, including effects such as color keying, image distortion, motion blur, and so on.

Color warping is a process in which a general shift in color is applied to an image. Known systems provide color warping using gamma curves for red, green and blue color components. While these curves provide comprehensive control of color, the relation between the user's interaction with such curves and the resulting change in color in an output image is non-intuitive. In particular, in many instances, the user will require a modification to be made to only a very small range of colors. Such small changes are made possible by the invention, and the color warping process is described as fine tuning, as this relates to the way in which particular colors can be changed without detrimentally affecting other colors.

At step 503 an image is identified for fine tuning. At step 504 fine tuning is performed in accordance with the present invention, and in accordance with operations performed by the processors 201 and 202 in response to the fine tuning instructions 403. At step 505 a question is asked as to whether the result is satisfactory. If not, control is directed to step 504, and the fine tuning is modified. Eventually, after several iterations, the resulting output image will have a satisfactory appearance. Thereafter, control is directed to step 506, where a question is asked as to whether another image requires fine tuning. If so, control is directed to step 503. Alternatively, definitions of fine tuning for an image or plurality of images is complete, and control is directed to step 507.

At step 507 a question is asked as to whether the fine tuning defined at step 504 should be animated. Fine tuning at different frames may be used to control an interpolated fine tuning effect for intermediate frames. This enables a gradual color change to be applied over the duration of a clip. If an animated fine tune is required, control is directed to step 508, where intermediate frames in the clip have their images modified automatically, without the need to repeat step 504 for each intermediate frame individually.

At step 509 a question is asked as to whether more image processing is required, for example, for other clips. If so, control is directed to step 502. Alternatively image processing is complete, and the resulting output clips may be exported to tape or other medium, at step 510.

Source image data 405 and output image data 508 have their image color defined by a red, green and blue intensity value for each pixel in the image. However, when defining fine tuning, a different color space is used, where dimensions of pure color are separated out from a single dimension of pure luminance. A color space having these characteristics is the Y'PbPr color space.

Figure 6:
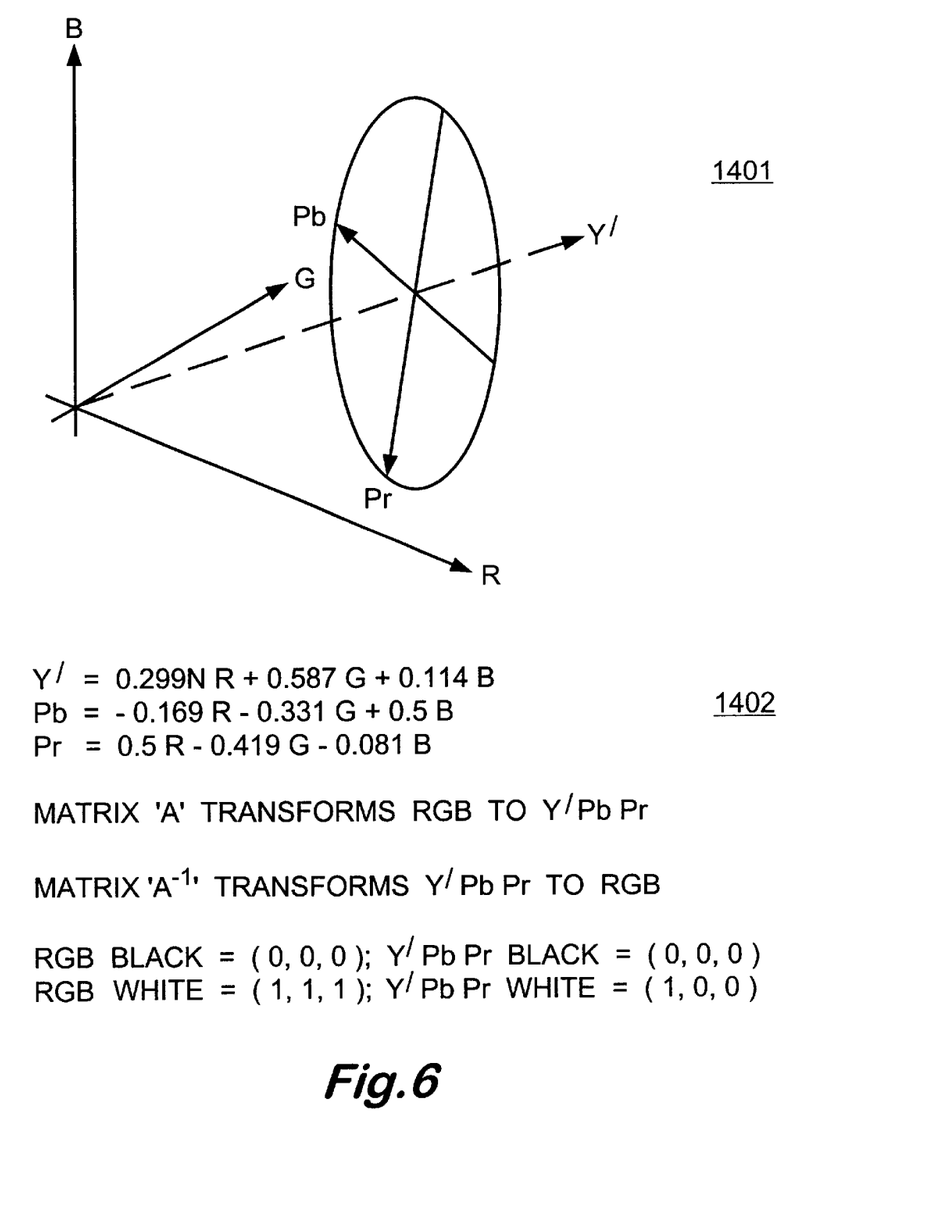
FIG. 6 details color spaces used in the present invention.

FIG. 6 details the relationship between RGB and Y'PbPr color spaces. In Y'PbPr color space, Y' is a dimension of pure luminance, that may be expressed as a range of fractional values from zero to one. Pb and Pr are pure color dimensions, with Pb being closely related to the blue of RGB, and Pr being closely related to green. Pb and Pr range across negative and positive values, and these may be considered as varying from minus one to plus one. However, these values are arbitrary and depend upon implementation.

Y'PbPr color space may be considered as having a cylindrical shape with a central axis Y', that is a vector extending out from the origin of RGB color space, as shown at 601. Conversion between these color spaces may be achieved by a matrix, and the parameters required for a transformation from RGB to Y'PbPr are detailed at 602. Transformation from RGB to Y'PbPr may be assigned to a matrix A. The inverse of A, $A^{-1}$, provides transformation from Y'PbPr to RGB. There is an intuitive relationship between these color spaces for colors of pure black and pure white, as shown at the bottom of FIG. 6.

Figure 7:
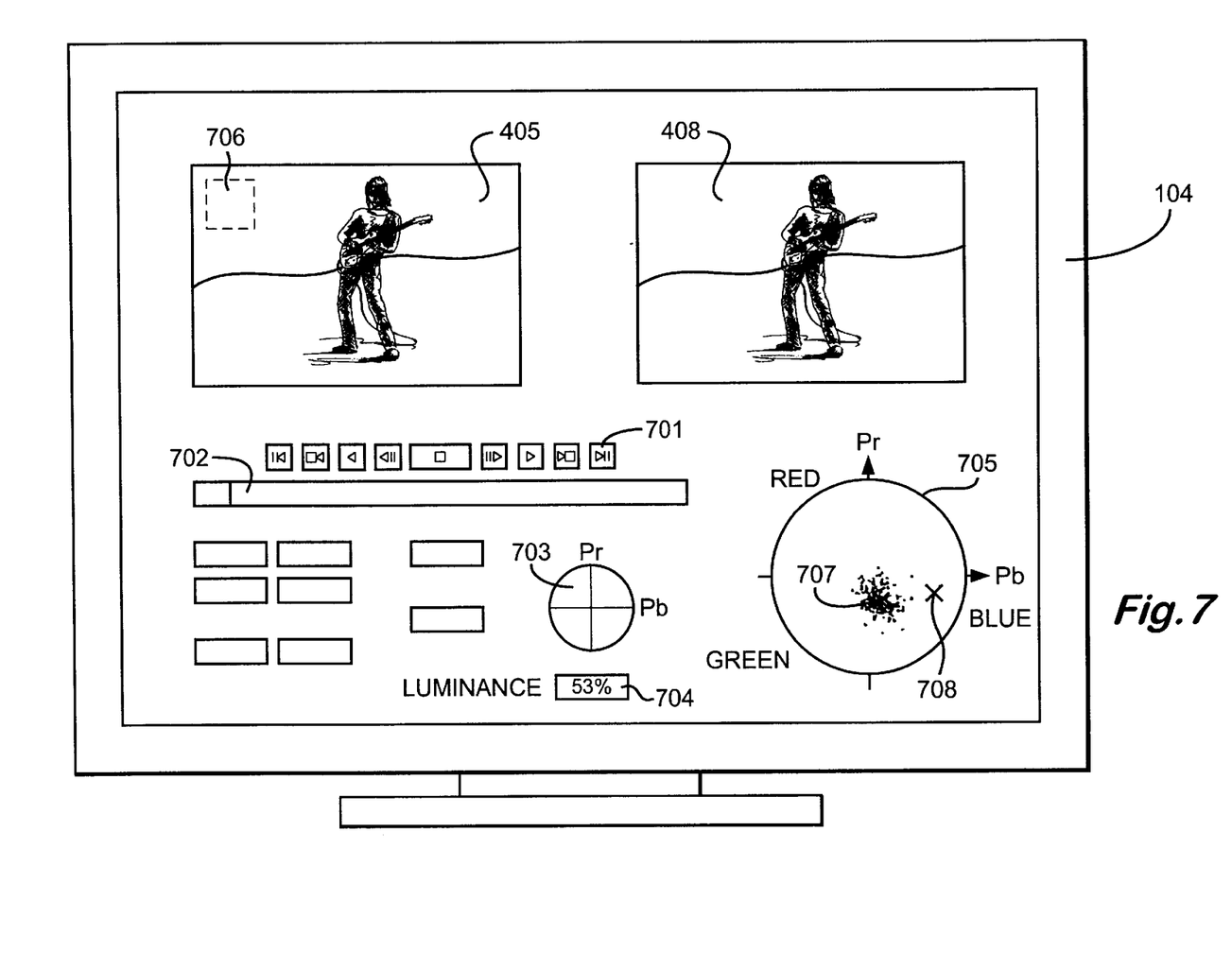
FIG. 7 details a user interface provided on the monitor shown in FIG. 1.

The user interface presented to the user on the monitor 104 shown in FIG. 1 is detailed in FIG. 7. A source image 405 and an output image 408 are displayed side by side in the upper half of the display area for comparison purposes. Transport controls 701 enable a user to select individual frames or play back a sequence of frames from a clip. The position within a clip of the currently displayed frame is marked on a timeline 702. A trackball widget 703 facilitates user input of two dimensional vectors of the PbPr color plane. A luminance display field facilitates user definition of a plane of luminance in which the color adjustment is primarily to be made. A graphical representation of a PbPr color plane at the luminance selected at 703, is displayed at 705.

The user can select a region of color 706 by dragging the cursor across an area of the source image 405. Pixels in the selected area are then plotted on the PbPr color plane as shown at 707. The user places a mark at the centre of these pixel colors. This is not shown in the Figure as it is obscured by the pixel plot 707. This mark represents the source color. The source color is defined by its PbPr co-ordinates on the display 705, and by the luminance value 704. By use of the trackball 703, the user is then able to define a destination color 708. It is intended that the source color should become transformed to the destination color. The results of the user's actions are displayed immediately in the output image 408. The user is quickly able to setup source and destination color definitions, and to thereby experiment and quickly achieve useful results. Fine tuning settings can be stored for recall in a later Flame session.

Figure 8:
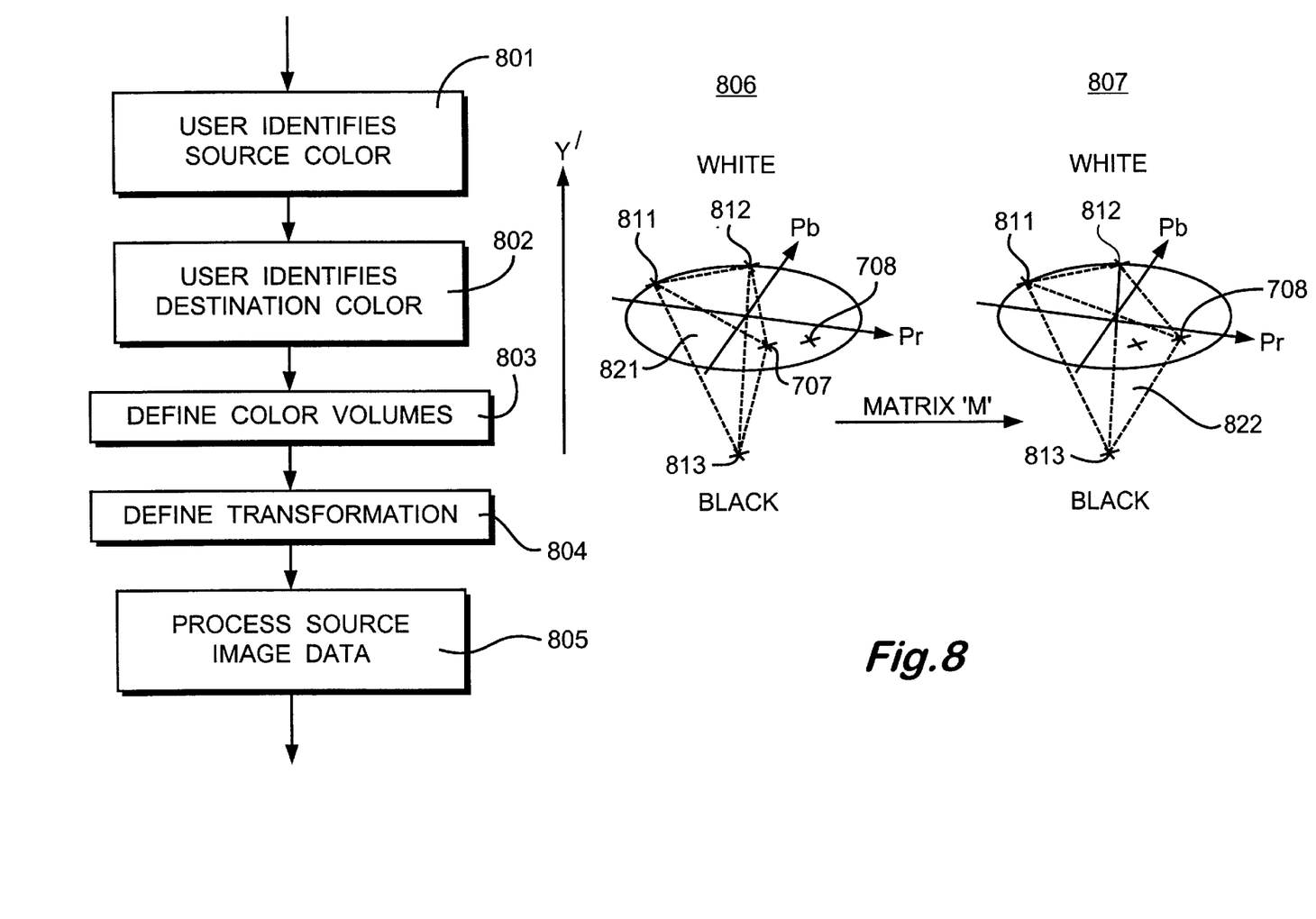
FIG. 8 summarises the invention and details the fine tuning process shown in FIG. 5, including a step of defining color volumes and a step of defining a transformation.

Details of the invention are summarised in FIG. 8. The fine tuning step 504 shown in FIG. 5 is detailed in steps 801 to 805. At step 801 the user identifies a source color 707. At step 802 the user identifies a destination color 708. At step 803 a source color volume and a destination color volume are defined. At step 804 a transformation is defined in response to processing of the color volumes defined at step 803. This transformation is a matrix "M" that, when applied to an RGB pixel of the source color, translates it to RGB pixel values of the destination color. Thus, although the source 707 and destination 708 colors are defined in Y'PbPr color space, the matrix "M" defined at step 804, operates directly upon RGB data values, thereby minimising the computation required when adjusting the color of an image. At step 805 the transformation is applied to image pixels of the source image 405, and the output image 408 is updated.

Although the user only has to identify source and destination colors as individual points on the PbPr color graph 705, a transformation in three-dimensional color space requires a volume to be defined. In known color warping systems, much of the complexity in their use arises from the need for the user to define not one source and destination point, but an entire source and destination volume. Various interfaces are provided for this, but the fact remains that the user thinks in terms of a point to point movement. In the invention, color volumes are derived automatically from individual source and destination color co-ordinates.

The definition of the source color volume is illustrated at 806. The source color point 707 is directly opposite a first point 811 and a second point 812 in the same luminance plane. The third point is always identified as being either white or black 813, whichever is furthest from the source color 707. In the example shown, black is the most distant point, and so the source color volume 821 is defined by points 707, 811, 812 and 813.

The destination color volume is illustrated at 807. This shares the three points 811, 812 and 813 automatically identified for the source color volume. The only difference is the destination color 708 itself. The destination color volume 822 is defined by points at 811, 812, 813 and 708. Matrix "M" defines a transformation of the source color volume 821 to the destination color volume 822. It can be seen that considerable transformation occurs from point 707 to point 708. However, elsewhere there is less movement. The transformation "M" will result in slight changes being made to colors anywhere in color space. The movement from source to destination color volumes characterises these changes, although pixels having colors outside these volumes will also be modified to some degree.

This approach ensures that maximum change is made to the color selected as the source color 707 by the user. Other slight color changes occur naturally, but mostly in the region of intended color change. This makes the invention especially useful for making slight changes to a particular color.

Figure 9:
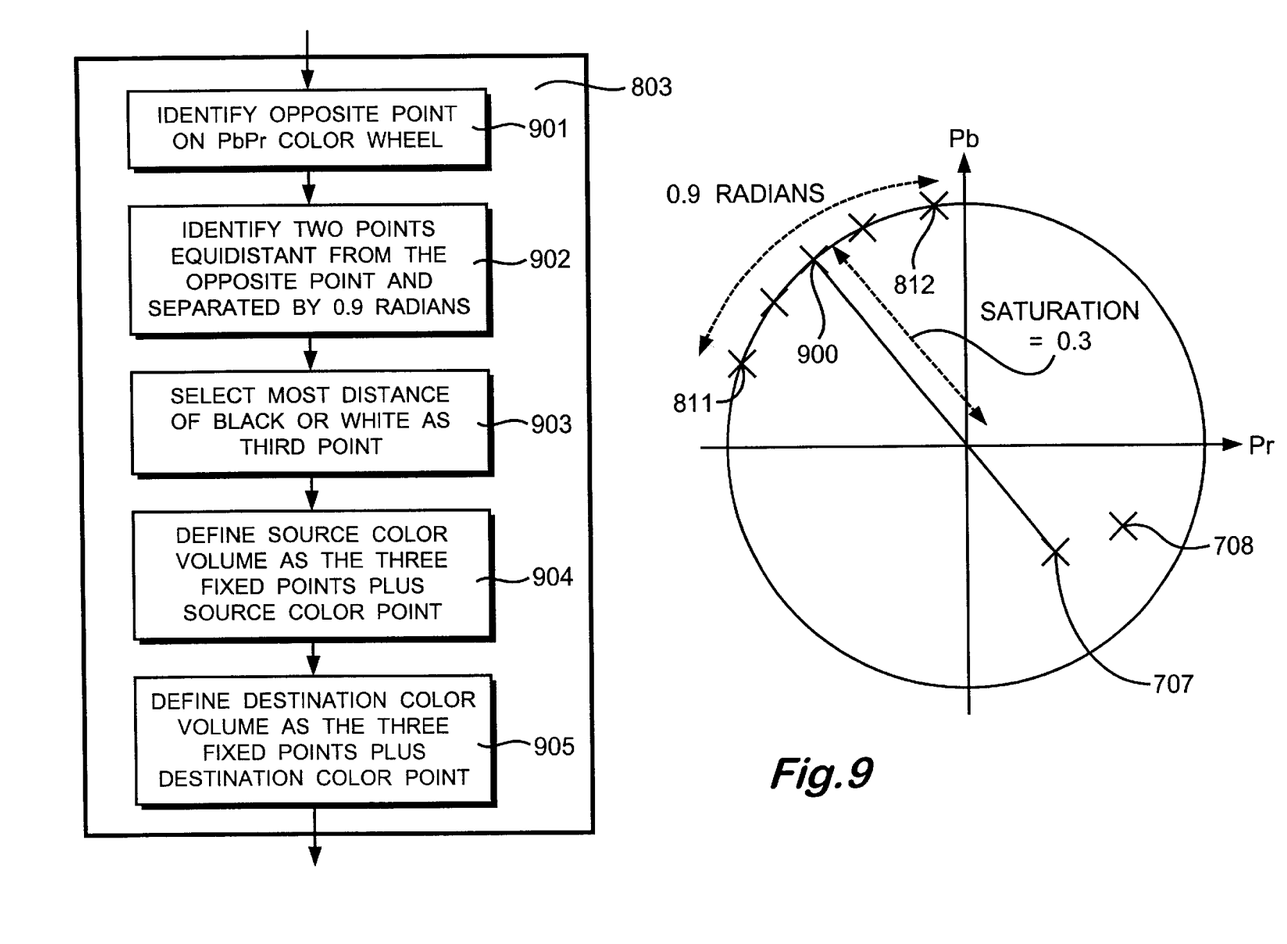
FIG. 9 details the step of defining color volumes shown in FIG. 8.

The process 803 of defining color volumes, shown in FIG. 8, is detailed in FIG. 9. At step 901 the source color 707 is considered, and an opposite point 900 on the PbPr color wheel is identified. At step 902 two points 811 and 812, equidistant from point 900, are identified. They are characterised in that they are separated by an angle of 0.9 radians. These two points 811 and 812 may be considered as being, in combination, opposite to the source color 707. Furthermore, their color saturation is set to 0.3, whereas color saturation values may vary from zero to one. Saturation is the length of the vector from PbPr=(0,0) to a color. It is given as the square root of the sum of the squares of Pb and Pr.

At step 903 the most distant of white or black, from the source color 707, is selected as being the third point 813. At step 904 the source color volume 821 is defined as the three points 811, 812 and 813 plus the source color point 707. At step 905 the destination color volume 822 is defined as the three points 811, 812 and 813 plus the destination color point 708.

Figure 10:
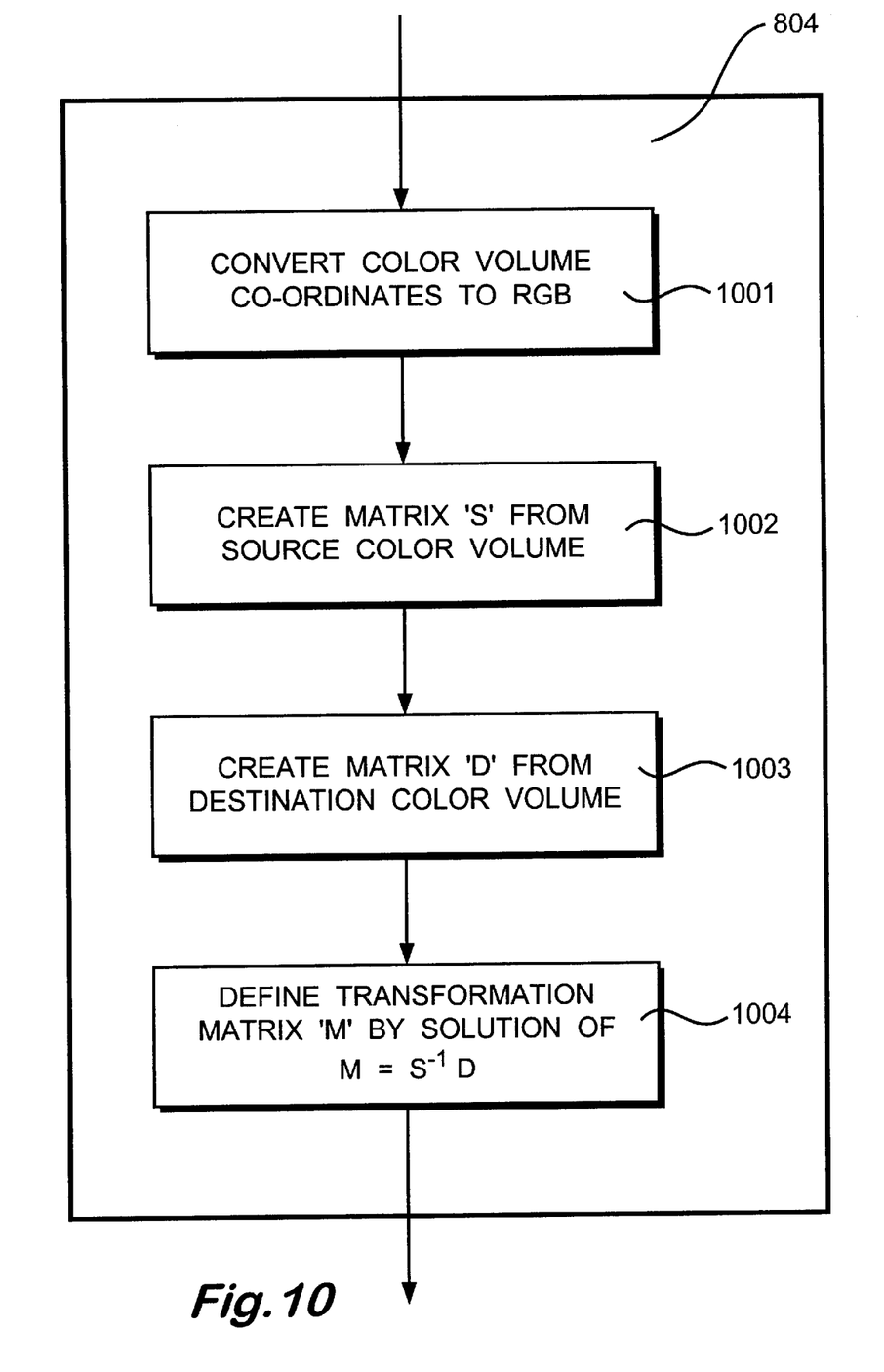
FIG. 10 details the step of defining a transformation shown in FIG. 8, including a step of defining a matrix.

The process 804 of defining the transformation "M", shown in FIG. 8, is detailed in FIG. 10. At step 1001 the co-ordinates of the color volume points are converted to RGB values using the inverse matrix $A^{-1}$ described at 602 in FIG. 6. At step 1002 a matrix "S" is created from coordinates of the source color volume. These four co-ordinates may be considered as S1, S2, S3 and S4, each having X, Y and Z co-ordinates representing red, green and blue intensity values respectively. At step 1003 a matrix "D" is created from co-ordinates of the destination color volume. These four co-ordinates may be considered as D1, D2, D3 and D4, each having X, Y and Z values representing red, green and blue.

The requirement for matrix "M" may be written as:

$$D = M \cdot S$$

In other words, matrix M transforms the source volume S to destination volume D. This relationship may be rewritten:

$$M = S^{-1} \cdot D$$

Figure 11:
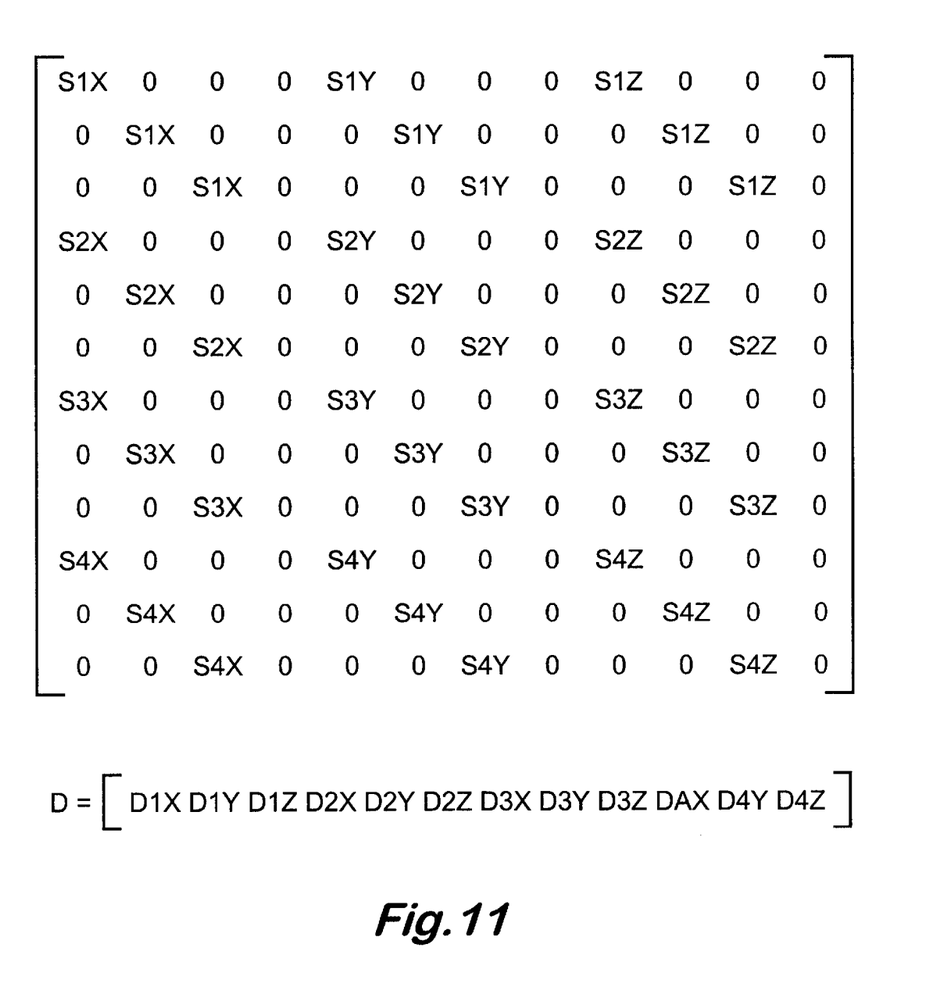
FIG. 11 details matrices used in the step of defining a matrix shown in FIG. 10.

At step 1004, the transformation matrix "M" is defined by calculating a solution to the above relation. The starting matrices S and D used to obtain the solution are shown in FIG. 11. The solution is obtained using known techniques for solving matrices, and the resulting matrix "M" is a four by four matrix of the type used for transformations in three dimensions.

What we claim is:

1. Apparatus for processing image data, comprising storage means arranged to store instructions, memory means for storing said instructions during execution and for storing image data, processing means for performing image processing in which said image data is processed to modify color values, and display means for facilitating user interaction with said image processing, wherein said processing means is configured such that, in response to said instructions, said image data is processed by steps of:
identifying a source color;
identifying a destination color;
identifying three fixed points in color space;
identifying a source color volume defined by said source color with said three fixed points;
identifying a destination color volume defined by said destination color and said three fixed points; and
defining a correspondence transformation between said source and destination color volumes; and
applying said correspondence transformation to said image data.

2. Apparatus according to claim 1, wherein said processing means is further configurable by said instructions such that said source and destination colors have the same luminance.

3. Apparatus according to claim 1, including graphical input means wherein user input signals from said graphical input means are used to identify said source and destination colors.

4. Apparatus according to claim 3, wherein said plane of constant luminance has Pb and Pr co-ordinates.

5. Apparatus according to claim 1, wherein said instructions configure said processing means to perform an additional operation of
identifying a luminance for said source and destination colors.

6. Apparatus according to claim 1, wherein said instructions may configure said processing means to perform operations such that one of said three fixed points is selected as being either white or black, in response to the length of the vector of one of said identified colors.

7. Apparatus according to claim 1, wherein two of said three fixed points are in the same plane of constant luminance as said identified colors.

8. Apparatus according to claim 1, wherein two of said three fixed points are opposite one of said identified colors with respect to the color centre in a plane of constant luminance.

9. Apparatus according to claim 1, wherein said transformation is defined differently at a plurality of images in a clip, and interpolation is performed to determine intermediate transformations at respective intermediate frames.

10. Apparatus according to claim 9, wherein said interpolation is controlled by an animation curve.

11. A method of processing image data in an image processing system including memory means for storing instructions and image data, processing means for performing image processing in which said image data is processed to modify color values,
said instructions defining color modifying operations to be performed by said processing means to process said image data, wherein said operations include:
identifying a source color;
identifying a destination color;
identifying three fixed points in color space;
identifying a source color volume defined by said source color with said three fixed points;
identifying a destination color volume defined by said destination color and said three fixed points; and
defining a correspondence transformation between said source and destination color volumes; and
applying said correspondence transformation to said image data.

12. A method according to claim 11, wherein said source and destination colors have the same luminance.

13. A method according to claim 11, wherein a user supplies color indications for said identification of source and destination colors, wherein said user generates said color indications with respect to colors in a plane of constant luminance.

14. A method according to claim 13, wherein said plane of constant luminance has Pb and Pr co-ordinates.

15. A method according to claim 11, including an additional operation of
identifying a luminance for said source and destination colors.

16. A method according to claim 11, wherein one of said three fixed points is selected as being either white or black, in response to the length of the vector of one of said identified colors.

17. A method according to claim 11, wherein two of said three fixed points are in the same plane of constant luminance as said identified colors.

18. A method according to claim 11, wherein two of said three fixed points are opposite one of said identified colors with respect to the centre of a plane of constant luminance.

19. A method according to claim 11, wherein said transformation is defined differently at a plurality of images in a clip, and interpolation is performed to determine intermediate transformations at respective intermediate frames.

20. A method according to claim 19, wherein said interpolation is controlled by an animation curve.

21. A computer-readable medium having computer-readable instructions executable by a computer configurable for image processing, said computer including memory means for storing said instructions and image data, processing means for performing image processing in which said image data is processed to modify color values, said instructions defining operations to be performed by said processing means to process said image data, wherein said operations include:
identifying a source color;
identifying a destination color;
identifying three fixed points in color space;
identifying a source color volume defined by said source color with said three fixed points;
identifying a destination color volume defined by said destination color and said three fixed points; and
defining a correspondence transformation between said source and destination color volumes; and
applying said correspondence transformation to said image data.

22. A computer-readable medium according to claim 21, wherein said source and destination colors have the same luminance.

23. A computer-readable medium according to claim 21, wherein a user supplies color indications for said identification of source and destination colors, wherein said user generates said color indications with respect to colors in a plane of constant luminance.

24. A computer-readable medium according to claim 23, wherein said plane of constant luminance has Pb and Pr co-ordinates.

25. A computer-readable medium according to claim 21, including an additional operation of identifying a luminance for said source and destination colors.

26. A computer-readable medium according to claim 21, wherein one of said three fixed points is selected as being either white or black, in response to the length of the vector of one of said identified colors.

27. A computer-readable medium according to claim 21, wherein two of said three fixed points are in the same plane of constant luminance as said identified colors.

28. A computer-readable medium according to claim 21, wherein two of said three fixed points are opposite one of said identified colors with respect to the centre of a plane of constant luminance.

29. A computer-readable medium according to claim 21, wherein said transformation is defined differently at a plurality of images in a clip, and interpolation is performed to determine intermediate transformations at respective intermediate frames.

30. A computer-readable medium according to claim 29, wherein said interpolation is controlled by an animation curve.

* * * * *